United States Patent [19]
Wilkin

[11] Patent Number: 5,406,740
[45] Date of Patent: Apr. 18, 1995

[54] BAIT TANK

[76] Inventor: Larry E. Wilkin, 3151 Avenida Simi, Simi Valley, Calif. 93063

[21] Appl. No.: 202,749

[22] Filed: Feb. 28, 1994

[51] Int. Cl.⁶ ............................................. H01K 97/05
[52] U.S. Cl. ....................................... 43/56; 119/203; 261/121.2
[58] Field of Search ............... 43/56, 55, 57; 119/203, 119/228; 261/121.2

[56] References Cited
U.S. PATENT DOCUMENTS
4,162,681 7/1979 Patterson ............................ 119/203

Primary Examiner—P. Austin Bradley
Assistant Examiner—Jeanne M. Elpel
Attorney, Agent, or Firm—Jack C. Munro

[57] ABSTRACT

A bait tank which has a smoothly contoured interior wall surface of the tank so that the fish that are swimming in the tank will not come into contact with any protrusion. Inlet water within the internal chamber of the tank is supplied in a direction tangential to the wall surface of the internal chamber of the tank to provide a continuous directional current for the fish to swim into. The access opening through the top of the bait tank is closable by a removable cutting board. A light is provided within the bottom of the tank to provide illumination of the internal chamber of the tank.

6 Claims, 1 Drawing Sheet

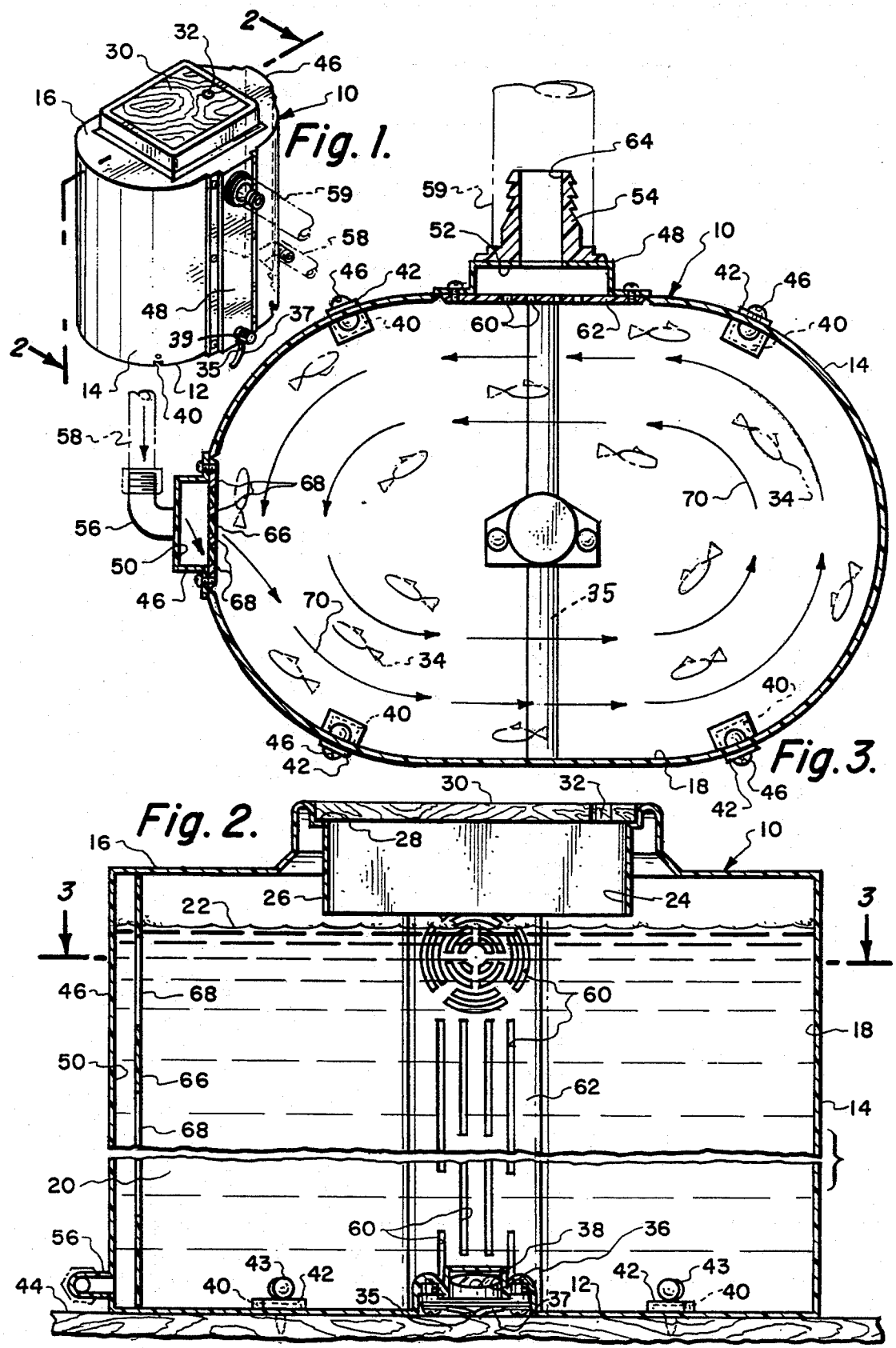

BAIT TANK

BACKGROUND OF THE INVENTION

1. Field of the Invention

The field of this invention is directed to tanks and more particularly to a bait tank which is designed to be fixedly mounted on the deck of a boat or ship which is to be utilized to keep the bait, such as small fish, alive until such are used.

2. Description of Prior Art

Bait tanks have long been used on board boats and ships in conjunction with the sport of fishing. The purpose of the bait tank is to provide an environment to contain in a confined manner live bait which is usually small fish. These bait tanks include a supply of water and the bait of the fish are to be contained within that water.

The bait tanks of the prior art have certain deficiencies. Normally it is desirable to fix in position the bait tank to the deck of the boat or ship. This fixing usually employs some kind of a mounting bracket, such as an L-shaped bracket, one leg of which is fixed to the bait tank and the opposite leg is fixedly secured by a fastener to the deck of the boat or ship. These type of brackets in the past have provided convenient "toe stubbers" for fishermen to trip over when walking past the bait tank.

Additionally, prior art bait tanks have merely directed the water into the tank without any consideration being given to the inlet direction. The result is the water swirls or becomes turbulent. Fish like to swim against the current. The result is the fish swim in a criss cross pattern bumping into one another resulting in scale loss which causes the fish to die.

Osmotic regulation (scale loss) is the primary cause of death for bait fish held in captivity. The interior wall surface of bait tanks of the prior art include several protrusions which the fish bump into when swimming within the tank. This causes the fish to lose their scales and die prematurely.

SUMMARY OF THE INVENTION

A bait tank which has an internal chamber which defines a wall surface. Mounted within this wall surface in a flush manner are a pair of baffle plates. The inlet baffle plate has slanted openings to conduct the flow of water into the internal chamber in a direction substantially tangential to the sidewall of the tank. The outlet baffle plate includes a series of holes through which water is to be conducted to hence to be dispensed exteriorly of the bait tank. Both baffle plates are flushly mounted with the wall surface of the internal chamber so as not to provide any protruding obstruction into the internal chamber which will interfere with the fish as such swim within the bait tank. The access opening provided within the top of the bait tank is to be closable by means of a removable cutting board. Included within the bottom of the bait tank is a light to provide illumination of the internal chamber of the bait tank.

The primary objective of the present invention is to construct a bait tank which substantially eliminates scale loss of bait fish.

Another objective of the present invention is to construct a bait tank which provides a continuous current for the fish to swim into which keeps the bait fish aligned in a certain direction thereby keeping the bait fish from running into each other.

Another objective of the present invention is by providing a current for the fish to swim into there is created a mild flow over the gills of the fish thus giving the fish more oxygen and helping to keep the fish alive.

Another objective of the present invention is to provide a light within the bottom of the fish tank which is to be activated at night so that the fish can observe one another and keep from crashing into the walls of the bait tank and each other.

Another objective of the present invention is to recess mounting brackets into the bottom of the bait tank so as to not place the brackets in a position where they can be contacted by the foot of a fisherman walking on the deck of the boat.

BRIEF DESCRIPTION OF THE DRAWING

FIG. 1 is an isometric exterior view of the bait tank of the present invention;

FIG. 2 is a longitudinal cross-sectional view taken along line 2—2 of FIG. 1; and FIG. 3 is a transverse cross-sectional view through the bait tank of the present invention taken along line 3—3 of FIG. 2.

DETAILED DESCRIPTION OF THE SHOWN EMBODIMENT

Referring particularly to the drawing there is shown in FIG. 1 the bait tank 10 of this invention. The bait tank 10 is formed of a sheet material planar bottom 12 which is integrally connected to a sheet material sidewall 14. The upper edge of the sidewall 14 is integrally connected to a sheet material planar top 16. The bottom 12, the sidewall 14 and the top 16 cooperate together to form an internal chamber 18. This internal chamber 18 is basically an oval shape as is clearly shown within FIG. 3 of the drawing. Within the internal chamber 18 is to be located a quantity of water 20. The water 20 will be normally at a level 22 which is directly adjacent the access opening 24 formed within the top 16. This access opening 24 is formed within a cylindrically shaped shield 26 which functions as a splash guard to prevent the water 20 from splashing exteriorly of the bait tank 10 during operation of the boat or ship. The exterior portion of the shield 26 is formed into a rectangularly shaped ledge 28. Supported on that ledge 28 is a cover in the form of a cutting board 30. The cutting board 30 is to include a finger opening 32 permitting entry of a finger of a human being so to remove the cutting board 30 so as to gain access to the internal chamber 18 so that additional bait fish 34 can be supplied within the water 20 or bait fish 34 can be removed from the water 20.

Formed within the bottom 12 and centrally located relative to the bottom 12 is a recess 36. Fixedly mounted within that recess 36 is a light 38. It is the purpose of the light 38 to illuminate the entire internal compartment 18 and therefore permit the fish 34 to observe one another and the walls of the internal chamber 18 and so that the fish don't run into each other or into the wall surface of the internal chamber 18. It is to be understood that the light 38 is to be electrically activated from a source of power (not shown) by conducting wires 37 which pass through channel 35 formed in bottom 12.

Also formed within the bottom 12 are indentations 40. There are shown four in number of the indentations 40. Each indentation 40 closely conforms to one leg of an L-shaped bracket 42 which in turn is then to be fixedly mounted to the wood deck 44 of the boat or ship. The upstanding leg of the bracket 42 is to be fixedly mounted by a fastener 46 to the sidewall 14. This mounting arrangement permits recessing of the brackets 42 to eliminate the locating of the brackets 42 in a position that can be readily contacted by a fisherman's foot which can prove to be a dangerous situation when a fisherman trips on a boat or a ship.

Mounted within the sidewall 14 are a water inlet housing 46 and water outlet housing 48. Within the water inlet housing 46 is a water inlet chamber 50. Formed within the water outlet housing 48 is a water outlet chamber 52. The water outlet housing 48 connects with a drain fitting 54 which is positioned very near the splash guard 26 at the upper end of the bait tank 10. The water inlet housing 46 connects with a water inlet fitting 56 which in turn connects with a water supply pipe 58. The water to be supplied through the pipe 58, through the fitting 56 and into the inlet chamber 50 and hence into the internal chamber 18. It is to be noted that the fitting 56 is located directly adjacent the bottom 12. Generally, fresh water is to be supplied at the bottom of internal chamber 18 with enough of a supplying velocity so as to carry waste and other particulate matter through the holes 60 of a baffle plate 62 which covers the outlet chamber 52. The water and any waste and particulate matter that is carried into the outer chamber 52 will then be sucked through the discharge opening 64 formed within the drain pipe 54 and into hose 59 to be then discarded at some appropriate discarding location located exteriorly of the tank 10. The inlet opening 50 is covered by a baffle plate 66 relative to the wall surface of the internal chamber 18. This baffle plate 66 includes a plurality of slanted openings 68. These slanted openings 68 are for the purpose of discharging the water within the internal chamber 18 in a direction that is represented by arrows 70. As is represented in FIG. 3, this discharging of the water within the internal chamber 18 provides a continuous oval shaped swirling motion within the internal chamber 18. This creating of the directional flow or current provides a direction for the fish 34 to swim and keeps the fish from swimming sideways and bumping into one another.

Both baffle plates 62 and 66 are mounted substantially flush with the wall surface of the internal chamber 18. The result is no protrusion extends into the internal chamber 18 that could provide an obstruction for the fish 34 to bump against thereby losing their scales which will result in premature death of the fish 34.

The bottom leg of the mounting brackets 42 is to engage with a fastener 43 to securely mount the mounting brackets 42 to the wood deck 44.

The cutting board 30 can be used by the fishermen as a cutting block to chop up the bait 34 or could be utilized to filet any fish that has been caught.

Drain plug 39 is to be removed to empty the tank 10 for cleaning.

What is claimed is:

1. A bait tank comprising:
a substantially enclosed housing having an internal chamber adapted to contain a quantity of water with live fish being contained in the water, said internal chamber having a wall surface, said housing having a bottom and a top with a sidewall connected therebetween, an access opening is formed within said top;
a water outlet chamber connected to said sidewall;
a water inlet connected with said sidewall, an inlet chamber connected to said water inlet, said inlet chamber connecting with said internal chamber, a first baffle plate entirely covering said inlet chamber and being in alignment with said wall surface thereby not protruding into said internal chamber, said first baffle plate including a series of openings through which inlet water is to flow into said internal chamber, said openings being slanted within said first baffle plate to direct the flow of inlet water tangentially along said sidewall providing a continuous directional current for the fish to swim into.

2. The bait tank as defined in claim 1 wherein:
said inlet chamber extending substantially from said top to said bottom.

3. The bait tank as defined in claim 2 wherein:
an outlet chamber connected to said water outlet, said outlet chamber connecting with said internal chamber, a second baffle plate entirely covering said outlet chamber and being in alignment with said wall surface thereby not protruding into said internal chamber, said second baffle plate including a series of openings through which water is to flow from said internal chamber to a location exteriorly of said bait tank.

4. The bait tank as defined in claim 3 wherein:
said access opening being closable by a removable cutting board.

5. The bait tank as defined in claim 3 wherein:
said bottom including light means, said light means being for the purpose of lighting said internal chamber.

6. The bait tank as defined in claim 3 wherein:
recessed indentations being formed within said bottom, each said indentation for receiving a mounting bracket for securely mounting said tank to an exterior structure.

* * * * *